March 14, 1950   C. R. P. STONOR   2,500,300
DECOUPLING CIRCUIT FOR ELECTRONIC DISCHARGE DEVICES
Filed June 28, 1946

INVENTOR
CHARLES RICHARD PAUL STONOR
BY
ATTORNEY

Patented Mar. 14, 1950

2,500,300

UNITED STATES PATENT OFFICE 2,500,300

DECOUPLING CIRCUIT FOR ELECTRONIC DISCHARGE DEVICES

Charles Richard Paul Stonor, Liverpool, England, assignor to Automatic Electric Laboratories Inc., Chicago, Ill., a corporation of Delaware Application June 28, 1946, Serial No. 679,910
In Great Britain July 20, 1945

2 Claims. (Cl. 179—171)

The present invention relates to thermionic valve amplifiers and finds particular application to amplifiers of the push-pull type such as are extensively used in the output stage of battery-operated radio receivers. The invention moreover is particularly concerned with amplifiers of the push-pull type which operate under Class B1, B2, AB1 or AB2 conditions as defined in British Standard 204/43, Subsection 19. For convenience such amplifiers will be referred to as being of the quiescent push-pull type.

It is already known that radio receivers incorporating such amplifiers give unsatisfactory reproduction of broadcast signals when the battery is nearing the end of its useful life and this is probably due not so much to the fact that the output voltage is somewhat reduced as because the battery has developed unduly high internal resistance. The chief object of the invention is to provide a slight modification of known circuits whereby this characteristic of nearly exhausted primary batteries does not react unfavourably on the performance of the set so that many extra hours of life may be obtained from a battery in these circumstances before the distortion and noise which it introduces become intolerable.

According to the invention the difficulties arising from the feeding of all the various valves from the same source which has by no means a negligible impedance are overcome not in the usual way by the use of a decoupling resistor in association with a decoupling capacitor but by the use of a small rectifier which may be of the dry disc type in association with a decoupling capacitor.

Figure 1:
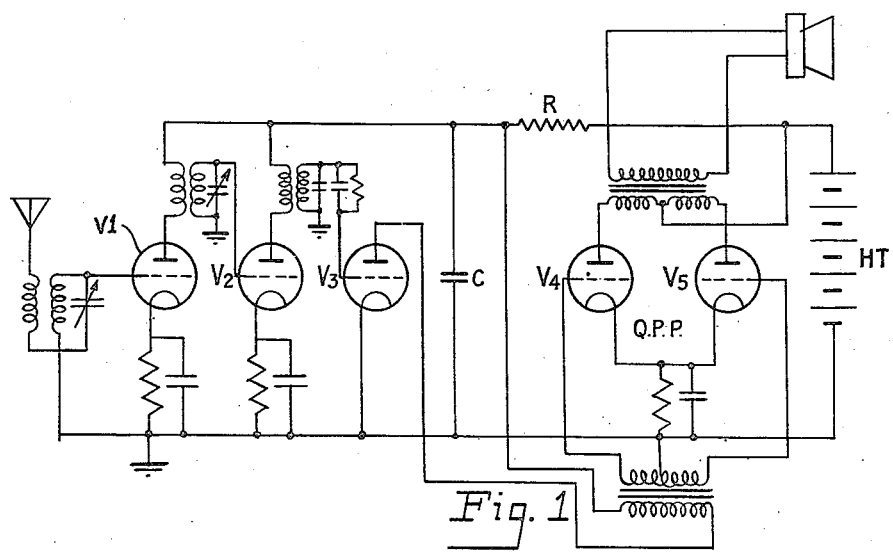
Figure 2:
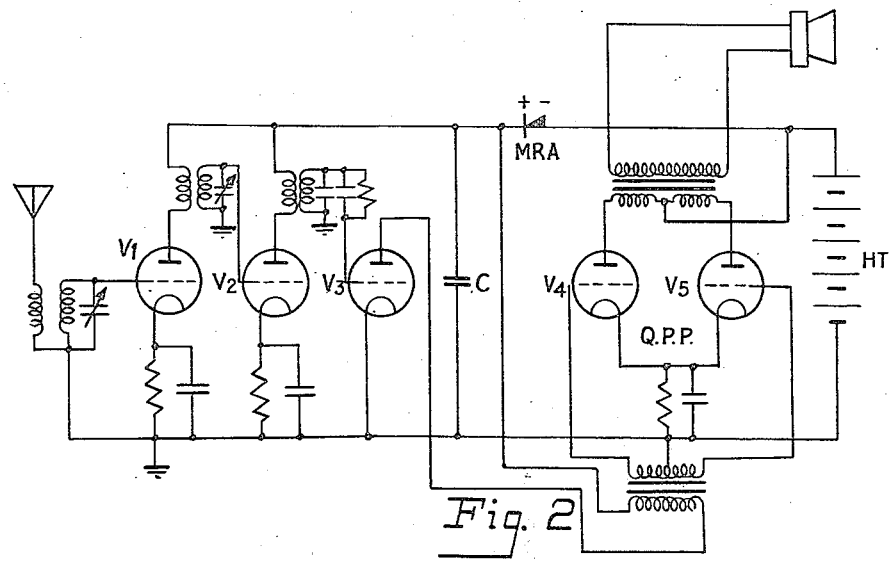

The invention will be more fully appreciated from a comparision of Figs. 1 and 2 of the accompanying drawings of which Fig. 1 indicates diagrammatically the use of a decoupling resistor as generally employed, while Fig. 2 shows the conditions when a rectifier is employed instead in accordance with the present invention.

As already suggested, if the impedance of the H. T. supply is small, no difficulty is experienced with a quiescent push-pull output as the increase in the anode current due to an input signal will cause no appreciable voltage variation across the supply. Hence the valves in the preceding stages suffer no variation in their anode voltage and satisfactory operation is obtained. However, in the case of a battery H. T. source, this assumption of low impedance no longer applies, particularly if the battery is old or nearly exhausted so that the internal resistance is considerable.

The two output valves shown at V4 and V5 in Fig. 1 are normally biassed to cut-off, and in a typical case under full drive they may increase their average anode current to roughly 20 m. a. If it is assumed that the battery H. T. has developed an internal resistance of 500 ohms, the voltage drop across it will be $$\frac{20}{1000} \times 500 = 10 \text{ volts}$$

This will mean that in the absence of decoupling arrangements, all the preceding valves such as V1, V2 and V3 lose 10 volts on their anodes every half cycle of the output frequency. This probably means that alternate negative and positive feedback occurs with consequent distortion even to the point of prolonged "motor boating."

If a common de-coupling resistor R is employed as shown in Fig. 1, the difficulty is only partially met. Under a sustained signal, the output valves cause the average battery voltage to fall and eventually the voltage on the capacitor C drops to an equal value. The delayed fall of the voltage across the capacitor will stop continuous oscillation but during a sustained loud passage a low frequency rattle will be noticed if the set concerned is using reaction on the detector stage. This is due to the appreciable reduction in sensitivity of the detector when the voltage on its anode falls. The signal to the grids of the output valves is correspondingly reduced, which decreases their drain on the battery so that its voltage rises and this restores the sensitivity of the detector stage. The sequence of events repeats itself and the result is a low frequency ripple in the loudspeaker. If the value of the capacitor is increased, this ripple may be made to disappear but only at the expense of introducing another objectionable feature in the shape of volume compression. This is due to the load represented by the loud passages decreasing the gain of the detector stage and resulting in flat reproduction.

According to the invention these difficulties are overcome by inserting a small rectifier MRA as shown in Fig. 2 in place of the resistor R shown in Fig. 1.

With this arrangement a higher voltage is available for the valves V1, V2 and V3, as the resistance of the rectifier in its conducting direction is appreciably less than the resistance value generally provided. In addition, when the battery voltage falls during full signal conditions from say, 100 v. to 90 v., the resistance of the rectifier in its non-conducting direction prevents the capacitor from discharging back through the battery so that there is an inappreciable fall of voltage as regards the valves V1, V2 and V3. With the normal decoupling arrangement the capacitor is inefficiently used since a large proportion of the energy stored therein is wasted by being discharged through the battery.

Furthermore, during even the most sustained loud passages, the capacitor voltage will remain sensibly the same, differing only slightly from the battery voltage when under no load from the output stage. This is because the battery voltage fluctuates at twice the frequency of the signal and hence between half waves the battery is momentarily under no load from the output stage and the voltage returns to a maximum. At this point the capacitor will be able to make good its slight loss of voltage, since the rectifier is now operating in its conducting direction and its resistance is only a few hundred ohms.

Under a normal de-coupling scheme the resistance R is too low to prevent the capacitor discharging through the battery when the load is applied and too high to prevent any appreciable re-charging when the load is removed.

The assumptions made above have been experimentally confirmed and batteries discarded as useless have been returned to service and found to give sustained satisfactory performance with the arrangement according to the invention.

I claim:

1. In a thermionic valve amplifier of the quiescent push-pull type, a plurality of electronic discharge devices each consisting of at least an anode and a cathode, a battery, said battery common to the discharge devices, a rectifying means connected in series with said battery, a condenser, said condenser connected across said battery and said rectifying means and charged approximately to the potential of said battery, said condenser potential being the anode voltage of the electronic discharge devices, a push-pull amplifier stage consisting of two thermionic valves the anode current of which is supplied by the battery, said rectifying means connected in series with the battery and between the push-pull stage and the condenser in such a manner as to prevent the condenser from discharging thru the battery when the battery potential decreases momentarily due to an increase in the anode current of the push-pull stage thereby maintaining the anode voltage of the discharge devices at a constant and maximum value.

2. In an electronic amplifier, an output stage, a plurality of preceding stages, each stage having an anode circuit, a source of direct current potential common to said stages, a circuit connecting said potential source to the anode circuit of said output stage, and a decoupling circuit comprising a condenser and a rectifier decoupling said preceding stages from said output stage, said condenser connected in series with said potential source and charged from said source, said condenser furnishing the anode potential to said preceding stages, said rectifier connected in series with and between said potential source and said condenser in such a manner as to prevent said condenser from discharging through said potential source when the potential of said potential source decreases momentarily due to an increase of the anode current of said output stage through said first circuit to thereby prevent a decrease in the anode potential of the preceding stages.

CHARLES RICHARD PAUL STONOR.

REFERENCES CITED

The following references are of record in the file of this patent:

UNITED STATES PATENTS

| Number | Name | Date |
| --- | --- | --- |
| 2,280,465 | Barrett, Jr. | Apr. 21, 1942 |